Nov. 7, 1944.  S. DARLINGTON  2,362,359
ATTENUATION REGULATOR
Filed Oct. 7, 1942  4 Sheets-Sheet 1

INVENTOR
S. DARLINGTON
BY G. H. Stevenson
ATTORNEY

Nov. 7, 1944.　　　　S. DARLINGTON　　　　2,362,359
ATTENUATION REGULATOR
Filed Oct. 7, 1942　　　　4 Sheets-Sheet 2

INVENTOR
S. DARLINGTON
BY G. H. Stevenson
ATTORNEY

Nov. 7, 1944.    S. DARLINGTON    2,362,359
ATTENUATION REGULATOR
Filed Oct. 7, 1942    4 Sheets-Sheet 3

INVENTOR
S. DARLINGTON
BY
ATTORNEY

Patented Nov. 7, 1944

2,362,359

UNITED STATES PATENT OFFICE 2,362,359

ATTENUATION REGULATOR

Sidney Darlington, New York, N. Y., assignor to Bell Telephone Laboratories, Incorporated, New York, N. Y., a corporation of New York Application October 7, 1942, Serial No. 461,171

5 Claims. (Cl. 178—44)

This invention relates to attenuation equalizers and more particularly to variable equalizers having a plurality of independent controls.

The principal objects of the invention are the reduction of interaction between the independent controls and the reduction of the constant attenuation of the equalizers.

In long distance transmission systems, such, for example, as multiplex carrier telephone systems, the maintenance of uniform transmission levels at all times requires the use of automatically controlled attenuation regulators to compensate for the effects of varying temperatures upon the attenuation in the transmission line. These regulators are usually located at several intermediate repeater points in the system and are controlled by pilot currents of suitable frequencies, the amplitudes of which reflect the variations of the line attenuation. The change in the attenuation varies in a rather complex manner with frequency in any given frequency range, but is such that it can be substantially compensated by the addition to or the subtraction from the attenuation characteristic at a selected normal temperature of fractional parts of a definite frequency dependent attenuation. The compensation may be effected by means of a single regulator of any of the various types disclosed in United States Patent 2,096,027, issued October 19, 1937, to H. W. Bode, but for various reasons it has been found advantageous to employ a plurality of regulators, each adapted to control a simple component of the attenuation variation. Thus, the attenuation variation may be broken down into components representing respectively flat loss, slope, and bulge frequency characteristics or, in other words, components varying according to the zero, first, and higher powers of frequency, and each component may be separately regulated. This general method of regulation is disclosed in United States Patent 2,246,307, issued June 17, 1941, to H. K. Krist. It has the advantage that the same devices may be used for the regulation of lines of different characteristics without noticeable sacrifice in the accuracy of the compensation.

The use of a plurality of separately controlled equalizers for the purpose of attenuation regulation gives rise to a problem of preventing or minimizing mutual interaction between the regulators. This interaction appears as a change in the attenuation of one equalizer when the adjustment of another is altered and must evidently be kept at a negligibly small value if accuracy of compensation is to be maintained. Equalizers of the single control type are particularly subject to interaction effects when closely coupled in tandem, since such networks cannot be constructed to have constant image impedances. Heretofore, the difficulty has been overcome by separating the networks either by resistance pads, with the penalty of a rather large flat loss, or by means of vacuum tubes, the use of which adds to the initial and maintenance costs of the system.

The present invention provides regulators of a new type in the form of unitary passive networks having two variable impedances which control the attenuation independently of each other in different desired manners and which operate with negligibly small interaction and with small constant loss. One impedance may, for example, control the attenuation in accordance with a desired slope characteristic and the other may control the attenuation independently in accordance with a desired bulge characteristic or in any other assigned manner. An important characteristic of the regulation is that variations of the control impedances by equal percentage amounts in opposite directions from a normal value add and subtract equal fractions of a definite frequency dependent attenuation.

The nature of the invention will be more fully understood from the following detailed description and by references to the attached drawings of which:

Mathematical theory

Figure 1:
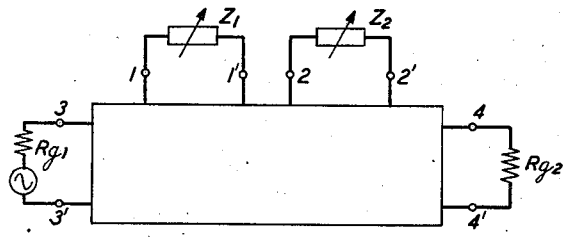
Figs. 1 to 4 are schematics used to illustrate the theory of the invention.

For the purpose of developing the principles underlying the invention it is convenient to treat the regulators as eight-pole passive networks of the general configuration shown in Fig. 1. The part of the circuit included within the box comprises only fixed impedance elements which provide mutual couplings between the circuits connected to the four pairs of terminals. An input source of resistance $R_{g1}$ is connected to the pair of terminals 3, 3' and a load resistance $R_{g2}$ is connected to terminals 4, 4'. The variable impedances by which the regulation is effected are shown at $Z_1$ and $Z_2$ connected respectively to terminals 1, 1' and 2, 2'. In general, the impedances may be unrestricted in character, but the use of resistance elements for all of the impedances except $Z_1$ and $Z_2$ results in greatly simplified design and construction. The source and load impedances can generally be made resistive or substantially so.

The characteristic of the system with which the problem of regulation is primarily concerned is the change in the load current or voltage as the impedances $Z_1$ and $Z_2$ are varied. It is necessary that the changes produced by the two variable impedances should be substantially independent and it is desirable that their magnitudes should vary in accordance with a particular mathematical law which will be described later. The way in which these results are obtained by the networks of the invention will be explained in the following mathematical treatment.

Let it be assumed that the impedances $Z_1$ and $Z_2$ have normal values $Z_{01}$ and $Z_{02}$ about which the variations take place and let $$\frac{Z_1}{Z_{01}}=x_1 \text{ and } \frac{Z_2}{Z_{02}}=x_2$$

It may then be shown that the most typical form of the expression for the insertion loss between the source $R_{g1}$ and the load $R_{g2}$ is $$e^\theta = e^{\theta_0}\frac{1+a_1x_1+a_2x_2+a_0x_1x_2}{b_0+b_1x_1+b_2x_2+x_1x_2} \quad (1)$$

wherein $\theta$ denotes the insertion loss, $\theta_0$ is a loss component which is independent of the variations of $Z_1$ and $Z_2$, and the $a$'s and $b$'s are coefficients dependent only on the fixed impedances of the system.

In the case of a single-control regulator, it has been shown in United States Patent 2,096,027 to H. W. Bode, that the circuit configuration and the element values can be made such that the insertion loss expression takes the form $$e^\theta = e^{\theta_0}\frac{1+ax}{a+x} \quad (2)$$

in which case $\theta_0$ represents the insertion loss of the network when $x$ is unity. This relationship has the property that replacing $x$ by its reciprocal replaces the loss variation $e^{(\theta-\theta_0)}$ by its reciprocal. In other words, replacing $x$ by its reciprocal replaces the insertion loss characteristic by its image with respect to the normal loss characteristic $\theta_0$. In the case of the two-control regulators of the invention, the networks are so designed that the same transformation is effected when both $x_1$ and $x_2$ are simultaneously replaced by their reciprocals. This result is achieved by designing the circuit so that the following equalities are obtained between the $a$ and $b$ coefficients of the insertion loss expression:

$$b_0=a_0; \quad b_1=a_2; \quad \text{and } b_2=a_1 \quad (3)$$

Under these conditions the insertion loss expression, Equation 1, becomes $$e^{(\theta-\theta_0)}=\frac{1+a_1x_1+a_2x_2+a_0x_1x_2}{a_0+a_2x_1+a_1x_2+x_1x_2} \quad (4)$$

from which it is readily seen that replacing $x_1$ and $x_2$ simultaneously by their reciprocals produces a reciprocal value of $e^{(\theta-\theta_0)}$.

The regulators according to the invention have the further property that if either variable impedance is kept fixed at its reference or normal value, the variation of the insertion loss as the other impedance is varied takes place in accordance with Equation 2. Thus, if $x_2$ be made equal to unity, Equation 4 becomes $$e^{(\theta-\theta_0)_1}=\frac{1+\frac{a_1+a_0}{1+a_2}x_1}{\frac{a_1+a_0}{1+a_2}+x_1} \quad (5)$$

and if $x_1$ be made equal to unity, $$e^{(\theta-\theta_0)_2}=\frac{1+\frac{a_2+a_0}{1+a_1}x_2}{\frac{a_2+a_0}{1+a_1}+x_2} \quad (6)$$

Except for a small interaction effect which is absent under the conditions specified above, Equations 5 and 6 define the loss contributions due to each of the separate controls regardless of the adjustment of the other. In other words, these equations define the principal parts of the loss contributions under any conditions of adjustment, the total loss being substantially equal to the sum of the two losses so defined. To demonstrate this, it is convenient to transform Equation 4 as follows:

Since $$\tanh(y/2)=\frac{e^y-1}{e^y+1} \quad (7)$$

Equation 4 may be transformed to $$\tanh\frac{\theta-\theta_0}{2}=\frac{(1-a_0)(1-x_1x_2)+(a_1-a_2)(x_1-x_2)}{(1+a_0)(1+x_1x_2)+(a_1+a_2)(x_1+x_2)} \quad (8)$$

which may be shown to be the same as $$\tanh\frac{\theta-\theta_0}{2}=\frac{G_1\frac{1-x_1}{1+x_1}+G_2\frac{1-x_2}{1+x_2}}{1+KG_1G_2\left(\frac{1-x_1}{1+x_1}\right)\left(\frac{1-x_2}{1+x_2}\right)} \quad (9)$$

wherein the quantities $G_1$, $G_2$ and $K$ have the values $$G_1=\frac{(1-a_0)-(a_1-a_2)}{1+a_0+a_1+a_2}$$
$$G_2=\frac{(1-a_0)+(a_1-a_2)}{1+a_0+a_1+a_2} \quad (10)$$

and $$K=\frac{(1+a_0)^2-(a_1+a_2)^2}{(1-a_0)^2-(a_1-a_2)^2}$$

Now, if the loss contributions, $(\theta-\theta_0)_1$ and $(\theta-\theta_0)_2$ defined by Equations 5 and 6 be denoted by $\Phi_1$ and $\Phi_2$ respectively, it may be shown with the help of Equation 7 that $$G_1\frac{1-x_1}{1+x_1}=\tanh\frac{\Phi_1}{2}$$

and $$G_2\frac{1-x_2}{1+x_2}=\tanh\frac{\Phi_2}{2} \quad (11)$$

consequently Equation 9 may be written as $$\tanh\frac{\theta-\theta_0}{2}=\frac{\tanh\frac{\Phi_1}{2}+\tanh\frac{\Phi_2}{2}}{1+K\tanh\frac{\Phi_1}{2}\tanh\frac{\Phi_2}{2}} \quad (12)$$

Equation 12 shows that so long as the factor $K$ is very nearly equal to unity $$\tanh\frac{\theta-\theta_0}{2}=\tanh\left(\frac{\Phi_1}{2}+\frac{\Phi_2}{2}\right) \text{ approximately} \quad (13)$$

that is, that the total attenuation change is approximately equal to the sum of the two independently controlled components defined by Equations 5 and 6.

It is evident from Equation 12 that if $K$ could be made exactly equal to unity, Equation 13 would define an exact instead of an approximate relationship. This would appear at first sight to provide an ideal solution which would permit the design of two-control equalizers with zero interaction between the controls. It turns out, however, that this condition cannot be met in a passive system without the normal loss $\theta_0$ becoming infinite or, alternatively, without one or the other of the loss components $\Phi_1$ and $\Phi_2$ becoming zero. In practice it has been found that a departure of the value of K from unity by as little as 2 per cent results in quite small normal loss and that departures as great as 10 per cent do not give rise to excessive interaction effects.

It may be shown that the physical condition corresponding to unity value of K is that the two branches containing the variable impedances should be conjugate or, in other words, that the transfer admittance between the two independent meshes including the impedances should be zero. To avoid the conjugate relationship it is necessary that the coefficient $a_0$ in Equation 4 should not be equal to the product $a_1 a_2$, but, in order that K may be close to unity, it is desirable that the difference between these quantities should be small relatively to $a_1 a_2$.

It has already been pointed out that it is advantageous to use only pure resistances in the coupling system, the coefficients $a_0$, $a_1$ and $a_2$ and the related factors $G_1$, $G_2$ and K then becoming simple numbers. In that case the frequency dependence of the regulator characteristics is determined wholly by the character of the variable impedances $Z_1$ and $Z_2$. Further simplification of the design is achieved by constructing the variable impedances in the form shown in Fig. 2. This figure shows a modified form of the variable impedance $Z_1$ comprising a four-terminal constant resistance network $N_1$ terminated at one pair of terminals by a variable resistance $R_1$ and adapted to be connected at the other pair of terminals to terminals 1, 1' of the eight pole. The network $N_1$ may be of any of the well-known constant resistance types, such, for example, as are described by O. J. Zobel in the Bell System Technical Journal, July 1928, in an article entitled "Distortion correction in electrical circuits with constant resistance recurrent networks." These networks are characterized by equal constant resistance image impedances at their two pairs of terminals and can be constructed to provide attenuations of any physically realizable frequency dependence.

If the image impedance of the network $N_1$ be denoted by $R_{01}$ and its transfer constant by $\psi_1$, then the impedance measured at terminals 1, 1' has the value $$Z_1 = R_{01} \frac{R_1 + R_{01} \tanh \psi_1}{R_{01} + R_1 \tanh \psi_1} \quad (14)$$

When the variable resistance $R_1$ takes the value $R_{01}$, the impedance $Z_1$ becomes equal to $R_{01}$, which, accordingly, may be taken as the reference or normal value of $Z_1$. Equation 14 may be transformed to $$x_1 = \frac{y_1 + \tanh \psi_1}{1 + y_1 \tanh \psi_1} \quad (15)$$

where $$y = \frac{R_1}{R_{01}}$$

and from this may be derived the relationship $$\frac{1-x_1}{1+x_1} = \frac{1-y_1}{1+y_1} e^{-2\psi_1} \quad (16)$$

The expression for $$\tanh \frac{\Phi_1}{2}$$

given in Equation 11 may now be written as $$\tanh \frac{\Phi_1}{2} = G_1 \frac{1-y_1}{1+y_1} e^{-2\psi_1} \quad (17)$$

the right-hand side of which includes the factor $G_1$ which is determined only by the coupling resistances, the quantity $y_1$ which measures the variation of the control resistance and is therefore a real number, and the attenuation constant $\psi_1$ of the network $N_1$.

When the same type of construction is used for the second variable impedance $Z_2$ a similar expression will be obtained for $$\tanh \frac{\Phi_2}{2}$$

namely, $$\tanh \frac{\Phi_2}{2} = G_2 \frac{1-y_2}{1+y_2} e^{-2\psi_2} \quad (18)$$

Substituting these values of $\Phi_1$ and $\Phi_2$ in Equation 13 gives the value of the total attenuation variation with substantial accuracy as $$(\theta - \theta_0) = 2 \tanh^{-1}\left(G_1 \frac{1-y_1}{1+y_1} e^{-2\psi_1}\right) + 2 \tanh^{-1}\left(G_2 \frac{1-y_2}{1+y_2} e^{-2\psi_2}\right) \quad (19)$$

Network design

Referring to Equations 17 and 18, it will be seen that the factors $G_1$ and $G_2$ determine the extent to which the transfer constants $\psi_1$ and $\psi_2$ of the constant resistance networks enter into the over-all characteristics of the regulator. The values of these factors may therefore be arrived at from a consideration of the desired regulation characteristics and the characteristics of available constant resistance attenuators. For the system to be realizable physically the values must lie between the limits of plus and minus unity. The factor K, which determines the interaction effect, may be chosen arbitrarily. In general, this should be nearly equal to unity, but it may be necessary to adjust the value by successive trials to avoid extreme or impractical values of certain of the branch impedances. Whether the values of $G_1$ and $G_2$ should be positive or negative and whether K should be greater or less than unity will depend upon the type of configuration adopted for the complete regulator circuit. The rules governing the choices will be given later.

Assigning numerical values to $G_1$, $G_2$ and K permits the numerical values of $a_0$, $a_1$ and $a_2$ of Equations 1 and 4 to be determined from the relationships $$a_1 = \frac{1 - KG_1G_2 - G_1 + G_2}{1 + KG_1G_2 + G_1 + G_2}$$

$$a_2 = \frac{1 - KG_1G_2 + G_1 - G_2}{1 + KG_1G_2 + G_1 + G_2} \quad (20)$$

and $$a_0 = \frac{1 + KG_1G_2 - G_1 - G_2}{1 + KG_1G_2 + G_1 + G_2}$$

These values of the $a$'s together with the basic equalities expressed in Equations 3 provide six equations that may be used in the design computations. For a given network configurations, the $a$'s and $b$'s of Equation 1 can be developed as expressions involving the branch impedances of the network and the assignment to them of numerical values permits the essential relationships between the branch impedances to be developed. The six equations are sufficient to determine the proportions of the branch impedances in networks having seven independent branches. If network configurations of greater complexities are employed, additional arbitrary conditions may be assigned as required.

The design procedure along the lines indicated above is straightforward, but the computations are generally lengthy and complex. The use of resistive impedances for the network branches and the use of the special form of variable impedance shown in Fig. 2, the reference or normal value of which is resistive, greatly simplifies the design computations by making the $a$ and $b$ coefficients and the quantities $G_1$, $G_2$ and $K$ all real numbers. It will be understood, however, that this is not an essential design condition and that other types of branch impedances may be used in accordance with the invention. Explicit design formulae, arrived at in the manner described, are given later for a number of representative networks.

Figure 2:
Figure 3:
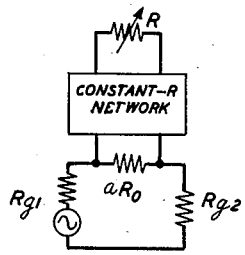
Figure 4:
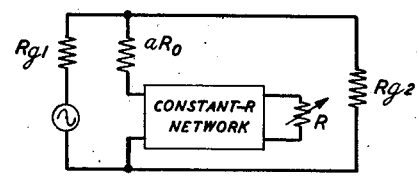

It has been pointed out in connection with Equations 5 and 6 that the regulators of the invention provide variable insertion loss characteristics of the type expressed by Equation 2, namely, $$e^{(\theta-\theta_0)} = \frac{1+ax}{a+x} \qquad (2)$$

when either of the variable impedances is held fixed at its reference value and the other is varied. Single control regulators having the above characteristic are disclosed in the above-mentioned United States Patent 2,096,027 to H. W. Bode. Two basic forms using variable impedances of the type shown in Fig. 2 are shown in Figs. 3 and 4, respectively. That shown in Fig. 3 is known as a series type regulator, because of the series disposition of the variable impedance between the source and the load, and that shown in Fig. 4 is known as the shunt type. These networks are reproduced here for the reason that the double-control regulators of the invention shown in the subsequent figures may be regarded as being composed of combinations of such structures coupled together in particular manners to obtain the desired regulation characteristics. Reference to these networks is useful in determining the signs of the coefficients $G_1$ and $G_2$ for the design of two-control regulators. The rules for the determination of the signs are arrived at as follows: The impedance relationship required in the circuit of Fig. 3 to permit Equation 2 to be satisfied is $$R_{s1} + R_{s2} = \frac{a}{a^2 - 1} R_0 \qquad (21)$$

which requires that $a$ be greater than unity. The corresponding relationship for Fig. 4 is $$\frac{1}{R_{s1}} + \frac{1}{R_{s2}} = \frac{a}{1-a^2} \frac{1}{R_0}$$

which requires $a$ to be less than unity. Now, Equation 2 can be put into the form $$\tanh \frac{\theta-\theta_0}{2} = G \frac{1-x}{1+x} \qquad (22)$$

where $$G = \frac{1-a}{1+a} \qquad (23)$$

from which it is seen that $G$ must be negative for a series type regulator and must be positive for a shunt type regulator. Accordingly, for the double control regulators of the invention, the factors $G_1$ and $G_2$ will be negative when the individual regulators to which they correspond are of the series type and will be positive when the individual regulators are of the shunt type.

Whether the factor $K$ should be greater or less than unity may be determined by the following rules, which have been arrived at empirically from a consideration of a large number of circuits. If both individual regulators are of the same kind, that is, both series type or both shunt type, $K$ should be less than unity. If the individual regulators are of different kinds, one series and the other shunt, $K$ should be greater than unity. The character of the individual regulators is ascertained by replacing each of the variable impedances in turn by a resistance equal to its reference value and noting the configurations of the resulting circuit. Another criterion for the determination of the types of the individual regulator is the behaviour of the insertion loss as the variable impedance changes between the extreme values of zero and infinity. For a series regulator the loss increases with the impedance, while for a shunt regulator the loss decreases as the impedance increases.

*Network configurations*

Figure 5:
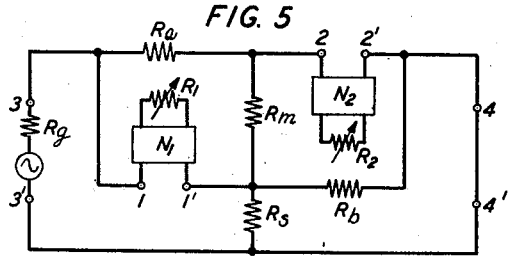
Fig. 5 shows the circuit configuration of one form of regulator in accordance with the invention.

One form of two-control regulator in accordance with the invention is shown in Fig. 5. This regulator is suitable for use between a high resistance source $R_g$ and a load of negligibly small impedance, represented by a short circuit between terminals 4, 4'. The variable impedances are provided by fixed constant resistance networks $N_1$ and $N_2$ terminated by variable resistances $R_1$ and $R_2$. This type of variable impedance is employed in all of the examples illustrated. The regulator is of the series-series type; consequently, the design factors $G_1$ and $G_2$ will both be negative and the factor $K$ will be less than unity.

The configuration is such that coupling between the input terminals 3, 3' and the output terminals 4, 4' is effected in two ways, first, directly through a shunt coupling resistance $R_s$ and, second, indirectly through the coupled meshes containing the variable impedances. The coupling resistance $R_m$ which constitutes the direct mutual impedance between these meshes plays an important part in the reduction of the interaction effect. Without this coupling the characteristic expressed by Equation 4 could be realized only approximately and reduction of the interaction would require such low values of the resistance $R_s$ as would result in excessive flat loss. The circuit comprises seven finite impedances in independent branches; consequently, the six equations referred to in the previous section suffice for the determination of six of these in terms of the seventh. Two of the impedances are the reference resistive values of $Z_1$ and $Z_2$ which will be designated respectively as $R_{01}$ and $R_{02}$. The values of the elements in terms of the source impedance $R_s$ are as follows:

$$\frac{R_{01}}{R_s} = \frac{(1-F_0^2)(F_1^2-1)[(1-F_0F_1F_2)+F_0^2(F_2^2-1)]}{(F_1-F_2F_0)[(1-F_0F_1F_2)^2-F_0^2(F_1^2-1)(F_2^2-1)]}$$

$$\frac{R_{02}}{R_s} = \frac{F_0(1-F_0^2)(F_2^2-1)(F_1-F_2F_0)}{[(1-F_0F_1F_2)^2-F_0^2(F_1^2-1)(F_2^2-1)][(1-F_0F_1F_2)+F_0^2(F_2^2-1)]}$$

$$\frac{R_a}{R_s} = \frac{(1-F_0^2)(F_1^2-1)}{[(1-F_0F_1F_2)^2-F_0^2(F_1^2-1)(F_2^2-1)]}$$

$$\frac{R_b}{R_s} = \frac{F_0F_1(1-F_0^2)(F_2^2-1)(F_2-F_1F_0)}{[(1-F_0F_1F_2)^2-F_0^2(F_1^2-1)(F_2^2-1)][(1-F_0F_1F_2)+F_0^2(F_2^2-1)]} \qquad (24)$$

$$\frac{R_c}{R_s} = \frac{F_0F_1(F_2-F_1F_0)}{[(1-F_0F_1F_2)^2-F_0^2(F_1^2-1)(F_2^2-1)]}$$

$$\frac{R_m}{R_s} = \frac{F_0^2(1-F_0^2)(F_1^2-1)(F_2^2-1)}{(1-F_0F_1F_2)[(1-F_0F_1F_2)^2-F_0^2(F_1^2-1)(F_2^2-1)]}$$

where $$F_0 = \frac{1-\sqrt{K}}{1+\sqrt{K}}, \quad F_1 = \frac{1-\sqrt{KG_1}}{1+\sqrt{KG_1}}, \quad F_2 = \frac{1-\sqrt{KG_2}}{1+\sqrt{KG_2}} \qquad (25)$$

subject to the conditions that $G_1$ and $G_2$ are both negative and $K$ is less than unity.

Figure 6:
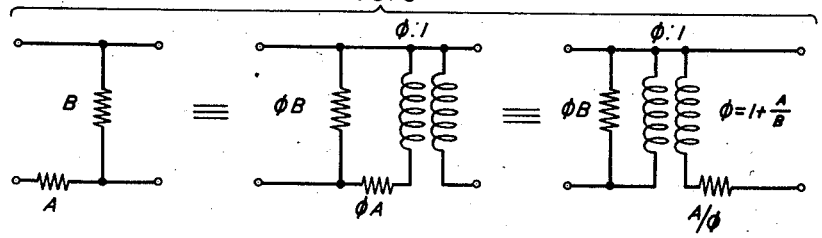
Fig. 6 illustrates certain principles used in the design of regulators according to the invention.
Figure 7:
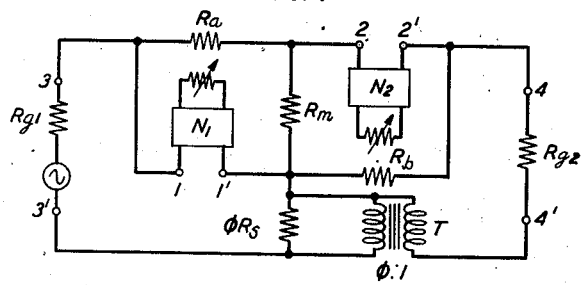
Figs. 7 to 14, inclusive, show the circuit configurations of additional forms of regulators according to the invention.

A two-control regulator suitable for use where the terminal impedances are both finite may be derived directly from the circuit shown in Fig. 5 by transferring part of the source impedance $R_s$ to the load terminals. The procedure makes use of the well-known network transformations illustrated in Fig. 6, according to which an L-network of two similar impedances may be replaced by the combination of a reversed L-network and an ideal transformer. In the figure, $\Phi$ denotes the transformer ratio, the value of which is given in terms of the impedances of the original L-network. The resulting regulator network is shown in Fig. 7, the ideal transformer T being replaced by an actual transformer designed to have high efficiency in the operating frequency range. The windings of the transformer should, of course, be poled to avoid a current reversal in the output. As the result of the operations the source impedance is reduced to a new lower value $R_{s1}$ and a load impedance of value $$R_{s2} = (R_s - R_{s1}) \div \Phi$$
$$= \frac{R_s(R_s - R_{s1})}{R_s + R_s - R_{s1}} \qquad (26)$$

is added between the load terminals. The network is otherwise unchanged and its regulating characteristics are not affected.

Figure 8:
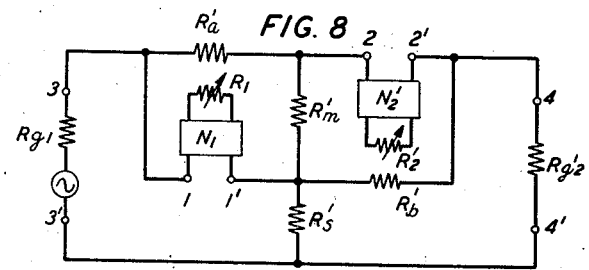

Another modified form may be obtained from the circuit of Fig. 5 by applying the same type of transformation first to the L-network formed by resistance $R_m$ and some part of $R_a$ and again to the combination of $R_b$ with the resistance transposed by the first operation into the branch containing network $N_2$. By proper choice of the fraction of $R_a$ used in the first transformation it is possible to make the combined transformation ratios of the transformers introduced by the two successive steps equal to the ratio of transformer T, in which case simple changes of the branch impedance levels permit all of the transformers to be eliminated. The resulting network, free of all transformers, is shown in Fig. 8, the impedances having new values being indicated by primes. As in the case of Fig. 7, the transformations do not affect the regulation characteristic.

Figure 9:
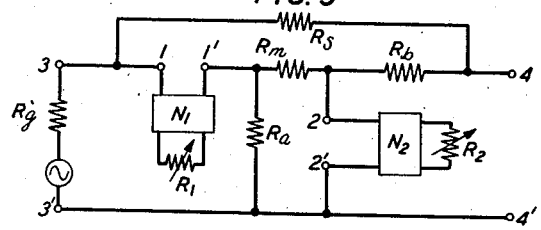

A further modified form of the invention may be derived from the network of Fig. 5 by the application of the principle of duality described by Guillemin, Communication Networks, 1935, volume II, page 246. This network, which is the dual of that in Fig. 5, is shown in Fig. 9. It is suitable for use where the source impedance is finite and the load impedance is infinite, for example, the grid circuit of a vacuum tube. The regulator is of the shunt-shunt type, that is, the two single-control regulators to which the system reduces when each variable impedance in turn is replaced by a resistance of its reference value are both of the shunt type shown in Fig. 4. The direct coupling between the input and the output terminals is a mutual admittance provided by series resistance $R_s$ and the variable impedances are likewise coupled directly by the admittance of resistance $R_m$. The structure may be looked on as comprising two transmission paths, one of which is constituted by resistance $R_s$ and the common return lead 4'3', with their input and their output terminals connected in parallel. This is the inverse of the circuit of Fig. 5 in which the corresponding paths have their input and their output terminals connected in series. The design requires the factors $G_1$ and $G_2$ to be positive and $K$ to be less than unity. Since the network is the dual of that shown in Fig. 5, Equations 24 may be used for design purposes if the resistance ratios on the left-hand sides are replaced by the corresponding conductance ratios and the factors $F_1$ and $F_2$ are replaced by their reciprocals.

Figure 10:
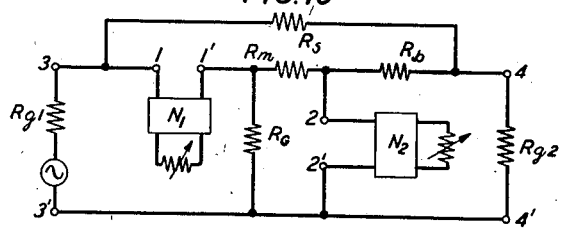

The type of regulator shown in Fig. 9 may be modified as shown in Fig. 10 for finite output impedances by transformations of the same kind as were described in connection with Figs. 5 and 8. In this case the procedure is a transfer of part of the source admittance to the output terminals and the starting point is the dividing of $R_s$ in Fig. 9 into two parallel portions, one of which is combined with $R_s$ to form an L-network.

Figure 11:
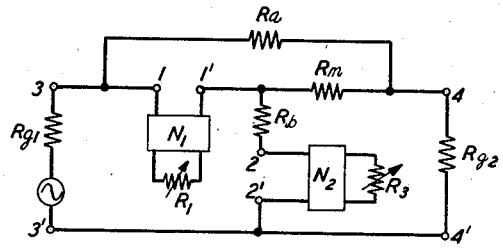

Fig. 11 shows another form of regulator according to the invention in which one of the component regulators is of the series type and the other is of the shunt type. Coupling between the independent meshes containing the two variable impedances is effected by the mutual impedance $R_m$ as in the case of Fig. 5. The network has seven independent impedances including the load resistance; consequently, the six design equations discussed in the preceding section suffice for its complete determination. The explicit formulae for the impedance branches are the following:

$$\frac{R_{s2}}{R_{s1}} = -\frac{F_0(F_1 - F_0 F_2)}{F_2(1 - F_0 F_1 F_2)}$$

$$\frac{R_{01}}{R_{s1}} = \frac{(F_1^2 - 1)}{(1 - F_0^2)(F_1 - F_0 F_2)}$$

$$\frac{R_{02}}{R_{s1}} = -\frac{F_0(F_1 - F_0 F_2)}{(1 - F_0^2)(1 - F_2^2)} \quad (27)$$

$$\frac{R_a}{R_{s1}} = \frac{F_1^2 - 1}{1 - F_0 F_1 F_2}$$

$$\frac{R_b}{R_{s1}} = -\frac{F_0(F_1 F_2 - F_0)}{(1 - F_0^2)(1 - F_2^2)}$$

$$\frac{R_m}{R_{s1}} = \frac{F_0^2(F_1^2 - 1)}{(1 - F_0^2)(1 - F_0 F_1 F_2)}$$

where $F_0$, $F_1$ and $F_2$ have the values given in Equations 25, subject to the conditions that $G_1$ is negative, $G_2$ is positive, and $K$ is greater than unity.

Figure 12:
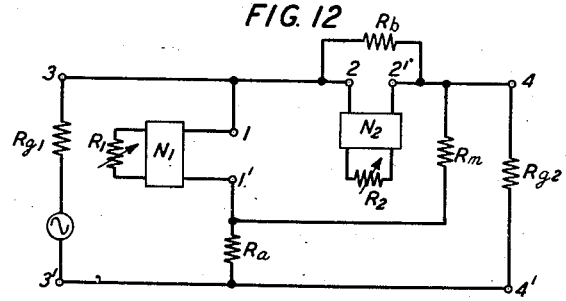

The dual of the network in Fig. 11 is shown in Fig. 12. Like Fig. 11, this network is of the shunt-series type. The design conditions are that $G_1$ should be positive, $G_2$ negative, and $K$ greater than unity. Equations 27 may be used to determine the element proportions by replacing the resistance ratios or the left-hand sides by the corresponding conductance ratios and replacing $F_1$ and $F_2$ by their reciprocals.

The networks shown in Figs. 5, 9, 11 and 12 may be regarded as prototype networks, since these have basis configurations which admit of complete design computation from the six essential design conditions, namely, the equalities of Equations 3, and the assignment of values to the factors $G_1$, $G_2$ and $K$. This, of course, amounts to the assignment of numerical values to the six $a$ and $b$ coefficients in Equation 1. As has been shown, various other forms may be derived from the prototypes by the application of well-known network transformations.

Figure 13:
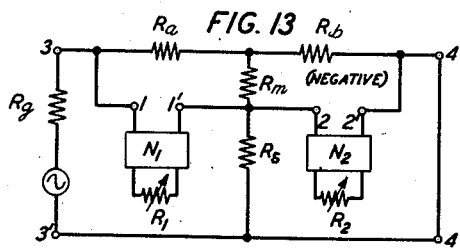
Figure 14:
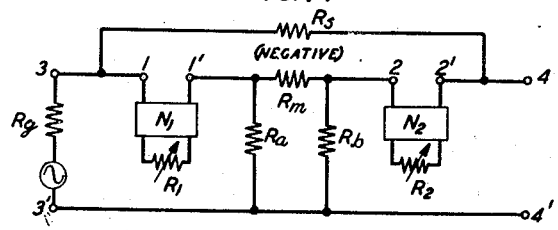

Two additional prototype networks, which are related as duals of each other, are shown in Figs. 13 and 14. These are somewhat similar to the networks of Figs. 5 and 9, respectively, but are characterized by negative resistance couplings between the variable impedances. Network 13 is of the series-series type and is adapted for use with a zero load impedance. Network 14 is of the shunt-shunt type and is adapted for use with an infinite load impedance. The formulae for the branch impedances in Fig. 13 are the following:

$$\frac{R_{01}}{R_s} = \frac{F_2(1 - F_0^2)(F_1^2 - 1)}{(F_1 F_2 - F_0)(1 - F_0 F_1 F_2)}$$

$$\frac{R_{02}}{R_s} = \frac{F_0 F_1^2 F_2(1 - F_0^2)(F_2^2 - 1)}{(F_1 F_2 - F_0)(1 - F_0 F_1 F_2)}$$

$$\frac{R_a}{R_s} = \frac{F_2(1 - F_0^2)(F_1^2 - 1)[(F_1 - F_2 F_0) + F_0^2 F_1(F_2^2 - 1)]}{(1 - F_0 F_1 F_2)[(F_2 - F_1 F_0)(F_1 - F_2 F_0) - F_0^3(F_1^2 - 1)(F_2^2 - 1)]}$$

$$(28)$$

$$\frac{R_b}{R_s} = \frac{F_0 F_1 F_2 (1 - F_0^2)(F_2^2 - 1)(F_1 F_2 - F_0)}{(1 - F_0 F_1 F_2)[(F_2 - F_1 F_0)(F_1 - F_2 F_0) - F_0^3(F_1^2 - 1)(F_2^2 - 1)]}$$

$$\frac{R_s}{R_s} = \frac{F_0 F_1 F_2}{1 - F_0 F_1 F_2}$$

$$\frac{R_m}{R_s} = -\frac{F_0^2 F_1 F_2 (1 - F_0^2)(F_1^2 - 1)(F_2^2 - 1)}{(1 - F_0 F_1 F_2)[(F_2 - F_1 F_0)(F_1 - F_2 F_0) - F_0^3(F_1^2 - 1)(F_2^2 - 1)]}$$

subject to the conditions that $G_1$ and $G_2$ are both negative and $K$ is less than unity. As previously explained, the same formulae may be used to calculate the branch admittances in Fig. 14, $G_1$ and $G_2$ being both positive in this case.

Figure 15:
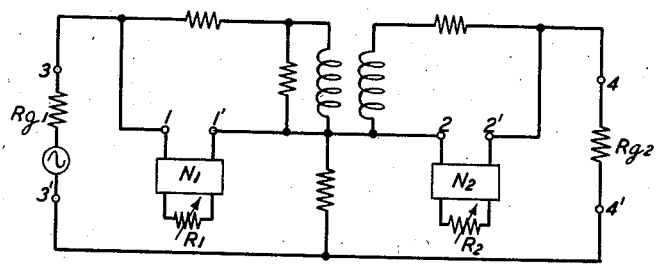
Figure 16:
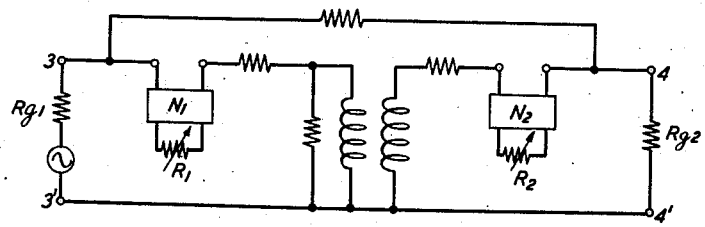

Physical networks corresponding to Figs. 13 and 14 may be obtained by replacing the T and $\pi$ networks constituted by $R_a$, $R_b$ and $R_m$ with equivalent combinations employing positive resistances and phase reversing transformers, the combination in each case comprising two series resistances coupled by a transformer having a resistance shunted across one of its windings. In addition to this, the transformations illustrated in Fig. 6 may be applied as in the case of Figs. 5 and 9 to transfer some of the source impedance to the load terminals, thereby adapting the circuits to finite terminations. The transformed networks are shown in Figs. 15 and 16. The transformers have to provide only a small degree of coupling; consequently, they do not have to be of particularly high efficiency. Proper attention to the poling of the windings is necessary to ensure the phase reversal effect predicated by the negative resistances in the prototype networks.

When the networks of the invention are employed for the automatic regulation of a telephone line, the variable resistances $R_1$ and $R_2$ may be constituted by thermistors as shown in United States Patent 2,246,307 to H. K. Krist to which reference has already been made. Each thermistor may be varied by means of a heating current under the control of a separate pilot current of suitable frequency. In this way the advantages of regulation at two frequencies in the operating range are substantially achieved, the two pilot frequencies being chosen to correspond to the maxima of the attenuation components they control.

If desired, the regulators of the invention may be used to control a single attenuation variation; that is, both of the component regulators may be made to produce the same attenuation variation. In this way the extent of the variation may be substantially twice that obtainable with a single control regulator.

What is claimed is:

1. An attenuation equalizer network comprising at least three independent coupled meshes providing at least three degrees of freedom, two adjustable impedances having frequency dependent characteristics included in separate branches of said network, a signal source and a load included in two other branches of said network, the impedances of the several branches of said network being so proportioned with respect to each other that the insertion loss for transmission between the said source and said load is expressed by the equation $$e^{(\theta - \theta_0)} = \frac{1 + a_1 x_1 + a_2 x_2 + a_0 x_1 x_2}{a_0 + a_2 x_1 + a_1 x_2 + x_1 x_2}$$

wherein $a_1$, $a_2$ and $a_0$ are coefficients dependent only on the fixed impedances of the network and are subject to the condition that $a_0$ is not equal to the product $a_1 a_2$, $e$ is the base of the Napierian logarithms, $x_1$ and $x_2$ are the ratios of the values of the adjustable impedances to assigned normal values, $\theta$ is the insertion loss of the system and $\theta_0$ is the value of $\theta$ when the variable impedances are adjusted to their respective normal values.

2. A network in accordance with claim 1 in which the network branch impedances exclusive of the adjustable impedances are all substantially pure resistances.

3. A network in accordance with claim 1 in which the network branch impedances exclusive of the adjustable impedances are all substantially pure resistances and in which the said adjustable impedances are substantially pure resistances at the adjustments corresponding to their assigned normal values.

4. A network in accordance with claim 1 in which the source and the load are coupled directly by one branch impedance and in which the variable impedances are directly coupled by a second branch impedance.

5. A network in accordance with claim 1 comprising separate transmission paths connecting said source and said load, a single resistance element in one of said paths providing direct coupling between the source and load, and the other of said paths comprising a plurality of coupled meshes including the said variable impedances.

SIDNEY DARLINGTON.